US011325216B2

(12) United States Patent
Bretschneider et al.

(10) Patent No.: US 11,325,216 B2
(45) Date of Patent: May 10, 2022

(54) MACHINE TOOL WITH OPTIMIZED ORIENTATION OF VIBRATION DAMPERS

(71) Applicant: Siemens Aktiengesellschaft, Munich (DE)

(72) Inventors: Jochen Bretschneider, Owingen (DE); Uwe Ladra, Erlangen (DE); Elmar Schäfers, Fürth (DE); Torsten Schür, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 175 days.

(21) Appl. No.: 16/818,753

(22) Filed: Mar. 13, 2020

(65) Prior Publication Data

US 2020/0290166 A1 Sep. 17, 2020

(30) Foreign Application Priority Data

Mar. 15, 2019 (EP) .................................... 19163207

(51) Int. Cl.
*B23Q 11/00* (2006.01)

(52) U.S. Cl.
CPC .... *B23Q 11/0032* (2013.01); *B23Q 2220/006* (2013.01)

(58) Field of Classification Search
CPC ............ B23Q 11/0032; B23Q 11/0035; B23Q 11/0039; B23B 29/022; B23B 29/04; B23B 29/12; B23B 27/002; B23B 27/007; B23B 2250/16; B23B 2260/044; B23B 2260/128; B23B 2260/068
See application file for complete search history.

(56) References Cited

U.S. PATENT DOCUMENTS

| 4,555,955 A * | 12/1985 | Morgan | ................ G01L 5/1627 73/862.06 |
| 5,209,326 A * | 5/1993 | Harper | ..................... B64G 1/38 188/378 |
| 5,913,955 A * | 6/1999 | Redmond | ............... F16F 15/02 82/1.11 |

(Continued)

FOREIGN PATENT DOCUMENTS

| CN | 1478006 A | 2/2004 |
| CN | 1715707 A | 1/2006 |

(Continued)

*Primary Examiner* — Nicole N Ramos
(74) *Attorney, Agent, or Firm* — Henry M. Feiereisen LLC

(57) ABSTRACT

A machine tool includes a first machine element movable in a travel direction and having first and second side faces. The first and second side faces of the first machine element run parallel to the travel direction and are oriented at a right angle to each other. The first machine element is moved in the travel direction in a guideway of a second machine element by a drive unit in a positionally controlled manner. The machine tool further includes first and second vibration dampers which are oriented at a right angle to the travel direction and configured to dampen vibrations of the first machine element in respective vibration directions. At least one of the first and second vibration dampers is oriented to solely dampen a vibration in a vibration direction that is neither parallel to the first side face nor parallel to the second side face.

8 Claims, 3 Drawing Sheets

(56) References Cited

U.S. PATENT DOCUMENTS

| | | | | |
|---|---|---|---|---|
| 6,296,093 | B1* | 10/2001 | Norris | B23Q 11/0032 188/378 |
| 6,322,299 | B1* | 11/2001 | Hartman | B23B 31/006 408/143 |
| 6,694,213 | B2* | 2/2004 | Claesson | B23B 29/022 409/141 |
| 6,776,563 | B2* | 8/2004 | Shamoto | B23B 29/12 310/323.16 |
| 6,925,915 | B1* | 8/2005 | Claesson | B23B 25/02 82/133 |
| 7,340,985 | B2* | 3/2008 | Claesson | B23B 27/002 173/162.1 |
| 2006/0053960 | A1 | 3/2006 | Stierle et al. | |
| 2006/0291973 | A1* | 12/2006 | Claesson | B23B 27/002 409/234 |
| 2007/0089574 | A1* | 4/2007 | Murakami | B23B 29/022 82/158 |
| 2008/0289923 | A1* | 11/2008 | Suzuki | B23Q 17/0976 188/379 |
| 2011/0303503 | A1 | 12/2011 | Merlette | |
| 2017/0129332 | A1 | 5/2017 | Nishimura et al. | |
| 2018/0093329 | A1* | 4/2018 | Umstadt | F16F 15/02 |
| 2018/0252033 | A1 | 9/2018 | Bohlen et al. | |

FOREIGN PATENT DOCUMENTS

| | | |
|---|---|---|
| CN | 1947934 A | 4/2007 |
| CN | 102326011 A | 1/2012 |
| CN | 203453360 U | 2/2014 |
| CN | 105436981 A | 3/2016 |
| CN | 105563225 A | 5/2016 |
| CN | 106458021 A | 2/2017 |
| CN | 107336062 A | 11/2017 |
| CN | 207629218 U | 7/2018 |
| CN | 108533163 A | 9/2018 |
| DE | 102017008966 A1 | 3/2018 |
| EP | 1001184 A2 | 5/2000 |
| EP | 3017911 A1 | 5/2016 |
| EP | 3017911 B1 | 4/2017 |
| JP | 2015016518 A | 1/2015 |

* cited by examiner

MACHINE TOOL WITH OPTIMIZED ORIENTATION OF VIBRATION DAMPERS

CROSS-REFERENCES TO RELATED APPLICATIONS

This application claims the priority of European Patent Application, Serial No. 19163207.4, filed Mar. 15, 2019, pursuant to 35 U.S.C. 119(a)-(d), the disclosure of which is incorporated herein by reference in its entirety as if fully set forth herein.

BACKGROUND OF THE INVENTION

The present invention relates to a machine tool.

The following discussion of related art is provided to assist the reader in understanding the advantages of the invention, and is not to be construed as an admission that this related art is prior art to this invention.

To date, conventional machine tools have two vibration dampers which are oriented parallel to two side faces. This type of orientation has shortcomings, e.g. when vibrations are oriented in directions that are not oriented parallel to the two side faces.

It would be desirable and advantageous to provide an improved machine tool to obviate prior art shortcomings.

SUMMARY OF THE INVENTION

According to one aspect of the present invention, a machine tool includes a first machine element movable in a travel direction and having first and second side faces, with the first and second side faces running parallel to the travel direction and oriented at a right angle to each other, a second machine element having a guideway for guiding a movement of the first machine element, a drive unit operably connected to the first machine element for moving the first machine element in the travel direction in a positionally controlled manner in the guideway of the second machine element, and first and second vibration dampers oriented at a right angle to the travel direction and configured to dampen vibrations of the first machine element in respective vibration directions, wherein at least one of the first and second vibration dampers is oriented to solely dampen a vibration in a vibration direction that is neither parallel to the first side face nor parallel to the second side face.

Provision may be made for one of the two vibration dampers to be oriented parallel to the first side face or parallel to the second side face. However, it may also be useful for both vibration dampers to be oriented neither parallel to the first side face nor parallel to the second side face. In this case, it can be advantageous when the vibration direction of the sole vibration that can be damped by the first vibration damper and the vibration direction of the sole vibration that can be damped by the second vibration damper are oriented at a right angle to each other. As a result, the two vibration dampers are decoupled from each other.

According to another advantageous feature of the present invention, the first and second vibration dampers can be embodied in the form of active vibration dampers. Active vibration damping results in superior damping behavior compared to passive vibration damping.

According to another advantageous feature of the present invention, the first and second vibration dampers can be arranged on the first machine element.

According to another advantageous feature of the present invention, provision may be made for an additional element at which or on which the first and second vibration dampers are arranged, and for a tool, wherein the first machine element can include a processing head and a spindle held in the processing head and can be operably connected to the tool for rotating the tool about a rotation axis, and wherein the additional element can be arranged between the first machine element and the processing head or arranged adjacent to the processing head.

According to another advantageous feature of the present invention, a further drive can be operably connected to the additional element for rotating the additional element in a positionally controlled manner about a rotation axis in parallel relationship to the travel direction. As a result the orientations of the two vibration dampers can be set as required.

According to another advantageous feature of the present invention, a further drive can be operably connected to the spindle for rotating the spindle in a positionally controlled manner about a rotation axis in parallel relationship to the travel direction.

According to another advantageous feature of the present invention, the processing head can include a handle configured to automatically release the processing head from the additional element, and the additional element can include a handle configured to automatically release the additional element from the first machine element, wherein the processing head is automatically connectable to the first machine element when the additional element is released from the first machine element. This makes it possible to optionally operate the machine tool with the two vibration dampers or without the two vibration dampers. There are situations when vibrations are caused only in a few applications. In such case, the machine tool can thus be operated without the additional element and therefore without the two vibration dampers over most of its operating time. Only in cases where rattling occurs can the additional element be incorporated.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1B:
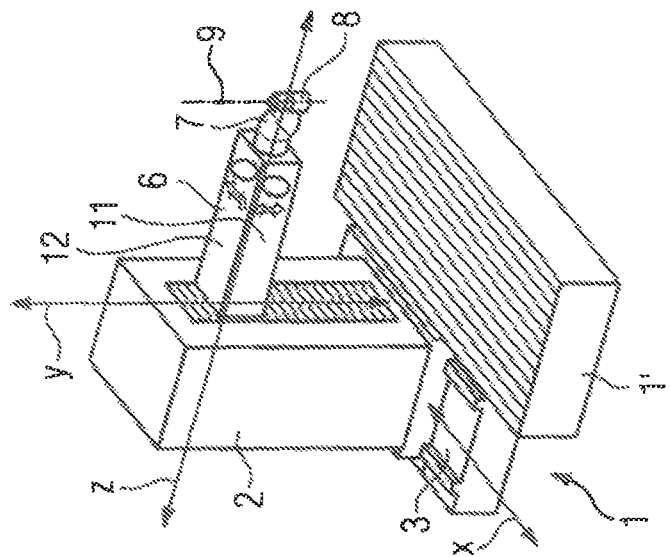
FIG. 1*b* is a schematic perspective view of the machine tool.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1A:
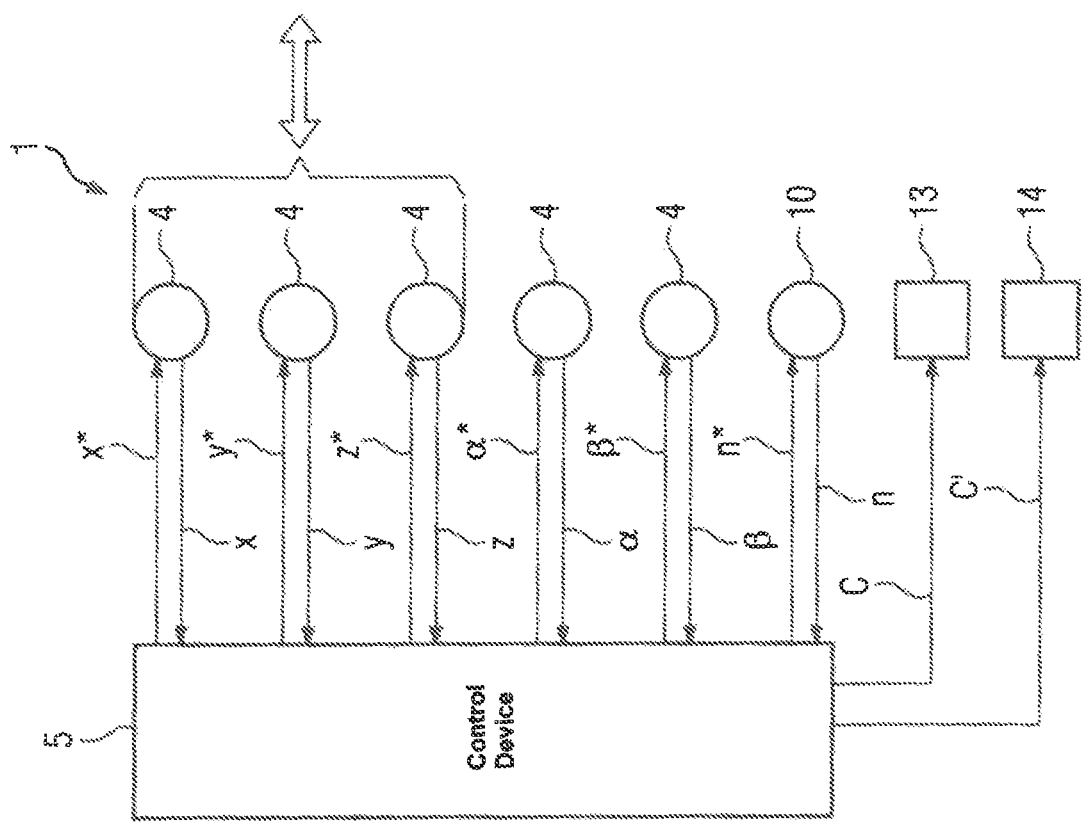
FIG. 1*a* is a schematic general illustration of a machine tool according to the present invention with a control device.

Turning now to the drawing, and in particular to FIGS. 1a and 1b, there are shown a schematic general illustration and a schematic perspective view, respectively, of a machine tool according to the present invention. The machine tool can have multiple machine elements. For example, as shown in FIG. 1b, the machine tool has a base body 1 as a machine element. Located on or at the base body 1, as a further machine element, is a workpiece table 1', on which a workpiece (not shown) can be fixed. A column 2 forms a further machine element. The column 2 is guided in a guideway 3 of the base body 1, and can be moved by a drive unit 4 in a positionally controlled manner in a travel direction as indicated by arrow x in FIG. 1a. A control device 5 specifies a corresponding positional target value x* for the corresponding drive unit 4.

A further guideway can be arranged inside the column 2. This guideway is not shown but can be configured of a same type as the guideway 3. This further guideway is referred to hereinafter as the external guideway to differentiate linguistically with regard to a further guideway, which will be referred to as internal guideway. A further drive unit 4 can move the internal guideway in a positionally controlled manner in a travel direction indicated by arrow y in the external guideway. For this purpose, the control device 5 specifies a corresponding positional target value y* for the corresponding drive unit 4.

As is further shown in FIG. 1b, the machine tool has a plunger 6 which is movable in a positionally controlled manner in a travel direction, indicated by arrow z, in the internal guideway by a further drive unit 4. For this purpose, the control device 5 specifies a corresponding positional target value z* for the corresponding drive unit 4. The internal guideway is also not shown here but can be configured of a same type as the guideway 3.

The plunger 6 includes a processing head 7. The processing head 7 holds a spindle 8, by which a tool (not shown) of the machine tool is rotated about a rotation axis 9 with a rotary speed n. In order to rotate the spindle 8, the control device 5 specifies a corresponding rotary speed target value n* for a spindle drive unit 10.

The plunger 6 represents a first machine element for the purpose of the present invention. The column 2, i.e. the internal guideway of the column 2, represents a second machine element for the purpose of the present invention. The z direction is the travel direction for purpose of the present invention.

The plunger 6, i.e. the first machine element, has a first side face 11 and a second side face 12. The side faces 11, 12 run parallel to the travel direction z and are oriented at a right angle to each other. In particular one of the two side faces 11, 12 is, at the same time, also oriented parallel to the direction x, the other one of the two side faces 11, 12 is parallel to the direction y.

Figure 2:
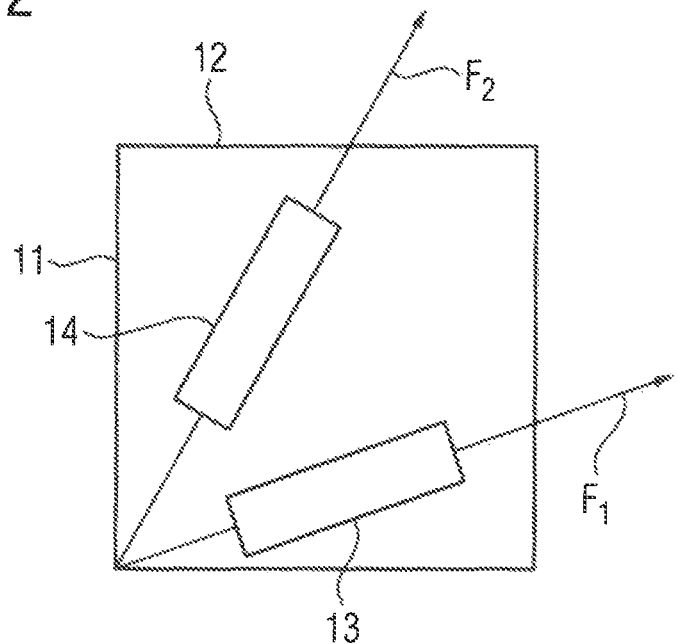
FIG. 2 is a diagram of vibration dampers of the machine tool in accordance with one embodiment.

FIG. 2 shows a diagram of the machine tool with a first vibration damper 13 and a second vibration damper 14. The first vibration damper 13 is capable of damping a vibration of the first machine element 6 in a vibration direction indicated by arrow F1. Likewise, the second vibration damper 14 is capable of damping a vibration of the first machine element 6 running in a vibration direction indicated by arrow F2. The vibration directions F1, F2 in which the vibration dampers 13, 14 act are oriented at a right angle to the travel direction z as shown in FIG. 2. It can be seen that the first vibration damper 13 is oriented such that the vibration direction F1 is oriented neither parallel to the first side face 11 nor parallel to the second face 12. Likewise, the second vibration damper 14 is oriented such that the vibration direction F2 is oriented neither parallel to the first side face 11 nor parallel to the second side face 12. Still, a corresponding activation using coordinate transformation, as generally known by a person skilled in the art, can be calculated without difficulty.

Figure 3:
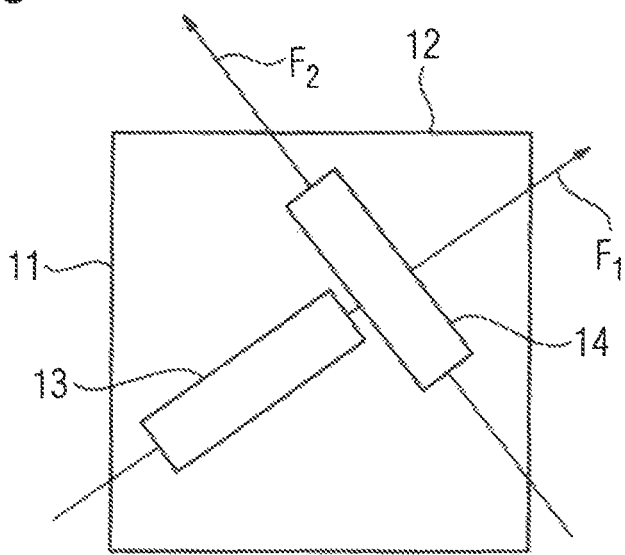
FIG. 3 is a diagram of vibration dampers of the machine tool in accordance with another embodiment.

According to the diagram in FIG. 2 the vibration dampers 13, 14 are oriented such that their vibration directions F1, F2 form an acute angle with regard to each other. As an alternative, as shown by FIG. 3, it is also possible for the vibration directions F1, F2 to be oriented at a right angle to each other.

The two vibration dampers 13, 14 can be embodied in the form of passive vibration dampers. Advantageously, the two vibration dampers 13, 14 are embodied, however, in the form of active vibration dampers. This is readily apparent from FIG. 1a which shows corresponding control signals C, C' being fed to the two vibration dampers 13, 14 from the control device 5, i.e. the vibration dampers 13, 14 are actively controlled by the control device 5. Any needed sensor assembly for detecting the presence of a vibration can be attached preferably either parallel to the directions x, y, z or at an angle to these directions. In particular, any vibration caused in the vibration directions F1, F2 can be detected.

The configurations according to FIGS. 1a, 1b, 2 and 3 involve arrangement of the two vibration dampers 13, 14 on the plunger 6, i.e. on the first machine element. Alternatively it is likewise possible for the two vibration dampers 13, 14 to be components of the processing head 7.

Figure 4:
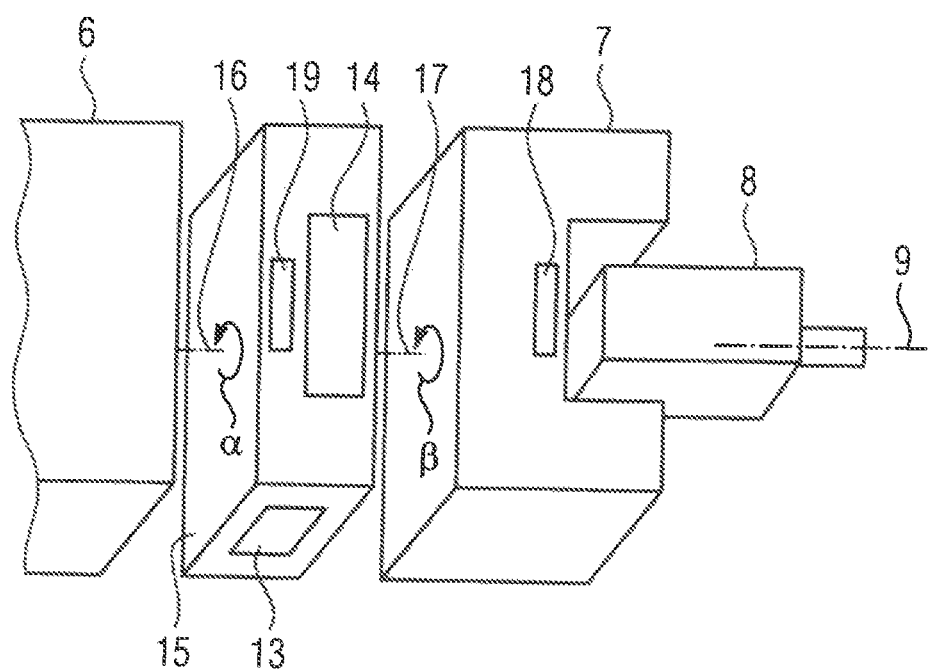
FIG. 4 is a perspective view of various components of a variation of the machine tool according to the present invention.

Referring now to FIG. 4, there is shown a perspective view of various components of a variation of a machine tool according to the present invention. In this embodiment, the machine tool includes an additional element 15 which is arranged at least temporarily between the first machine element (plunger) 6 and the processing head 7 or adjacent to the processing head 7. In this embodiment, the first and second vibration dampers 13, 14 can be arranged at or on the additional element 15.

Advantageously, the additional element 15 can be rotated by a further drive unit 4 in a positionally controlled manner about a rotation axis 16 extending in parallel relation to the travel direction z. For this purpose, the control device 5 specifies a corresponding first angle target value α* for the corresponding drive unit 4. As a result, the first vibration damper 13 can, for example, be made stronger than the second vibration damper 14 so that the first vibration damper 13 can damp an incident vibration to a greater degree than the second vibration damper 14. In this case, the rotation of the additional element 15 about the rotation axis 16 can be determined such that the first vibration direction F1 is oriented parallel or almost parallel to the direction in which the first machine element 6 is actually vibrating. The second vibration damper 14 then merely needs to compensate a minor remnant of the vibration from the first machine element 6, caused, for example, by an incorrect arrangement during rotation of the additional element 15. The direction in which the first machine element 6 is actually vibrating can be determined, for example, by the direction of the cutting force of a machining process or the active force of a milling process. Orientation of the additional element 15 can be effected as required prior to startup of the machine tool and even during ongoing operations, i.e. during the machining process on a workpiece.

When the additional element 15 rotates, there is a possibility that the rotation axis 9 of the spindle 8 also rotates at the same time. Alternatively, it is possible for the rotation axis 9 of the spindle 8 to be able to rotate about a second rotation axis 17 in parallel relation to the travel direction z in a positionally controlled manner by means of a further drive unit 4. In this case the control device 5 specifies a corresponding second angle target value β* for the corresponding drive unit 4 for this purpose.

Advantageously, the processing head 7 has a handle 18 as is readily apparent from FIG. 4. By means of the handle 18, the processing head 7 can be automatically released and therefore detached from the additional element 15. Likewise, the additional element 15 has a handle 19 to allow automatic release of the additional element 15 and detachment from the first machine element 6. As the additional element 15 is released and detached from the first machine element 6, the processing head 7 can then be automatically connected to the first machine element 6 again. The machine tool can therefore be operated both with the additional element 15 and also without the additional element 15.

In summary, the present invention discloses a machine tool having at least a first machine element 6 and a second machine element 2. The first machine element 6 is guided in a guideway of the second machine element 2 and can be moved in a travel direction z in a positionally controlled manner in the guideway of the second machine element 2 by a drive unit 4 of the machine tool. The first machine element 6 has a first side face 11 and a second side face 12 which run parallel to the travel direction z and are oriented at a right angle to each other. The machine tool has a first vibration damper 13 and a second vibration damper 14, by which a vibration of the first machine element 6 running in respective vibration directions F1, F2 can be damped. The vibration directions F1, F2 are oriented at a right angle to the travel direction z. The first vibration damper 13 and/or the second vibration damper 14 are oriented such that the vibration direction F1, F2 of the sole vibration that can be damped by the first vibration damper 13 or second vibration damper 14 is oriented neither parallel to the first side face 11 nor parallel to the second side face 12.

The present invention has many advantages. In particular the orientation of the vibration direction F1, F2 of the vibration dampers 13, 14 can be aligned as required.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A machine tool, comprising:
   a first machine element movable in a travel direction and having first and second side faces, said first and second side faces running parallel to the travel direction and oriented at a right angle to each other;
   a second machine element having a guideway for guiding a movement of the first machine element;
   a drive operably connected to the first machine element for moving the first machine element in the travel direction in a positionally controlled manner in the guideway of the second machine element; and
   first and second vibration dampers disposed in a plane oriented perpendicular to the travel direction, wherein the first vibration damper is aligned with a first vibration direction of the first machine element and the second vibration damper is aligned with a second vibration direction of the first machine element, wherein at least one of the first and second vibration dampers is neither parallel to the first side face nor parallel to the second side face.

2. The machine tool of claim 1, wherein the vibration direction of the vibration that is damped by the first vibration damper and the vibration direction of the vibration that is damped by the second vibration damper are oriented at a right angle to each other.

3. The machine tool of claim 1, wherein the first and second vibration dampers are embodied in the form of active vibration dampers.

4. The machine tool of claim 1, wherein the first and second vibration dampers are arranged on the first machine element.

5. The machine tool of claim 1, further comprising:
   an additional element at which or on which the first and second vibration dampers are arranged; and
   a tool,
   wherein the first machine element comprises a processing head and a spindle held in the processing head and operably connected to the tool for rotating the tool about a rotation axis, and
   wherein the additional element is arranged between the first machine element and the processing head or arranged adjacent to the processing head.

6. The machine tool of claim 5, further comprising a further drive operably connected to the additional element for rotating the additional element in a positionally controlled manner about a rotation axis in parallel relationship to the travel direction.

7. The machine tool of claim 5, further comprising a further drive operably connected to the spindle for rotating the spindle in a positionally controlled manner about a rotation axis in parallel relationship to the travel direction.

8. The machine tool of claim 5, wherein the processing head includes a handle configured to automatically release the processing head from the additional element, and wherein the additional element includes a handle configured to automatically release the additional element from the first machine element, said processing head being automatically connectable to the first machine element when the additional element is released from the first machine element.

* * * * *